Peter Vanderbelt
Horse Hay Fork.
71343
PATENTED
NOV 26 1867
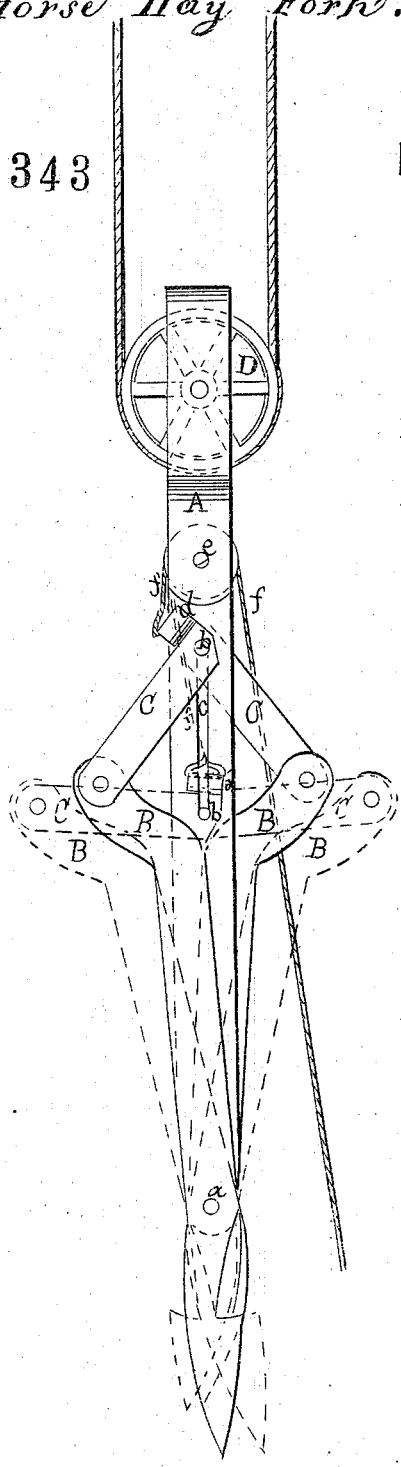
Witnesses
Theodore Lang
J. W. Mister
Inventor
Peter Vanderbelt
by his Atty
S. S. Fahnestock

United States Patent Office.

PETER VANDERBELT, JR., OF HUGHESVILLE, PENNSYLVANIA.

Letters Patent No. 71,343, dated November 26, 1867.

IMPROVEMENT IN HORSE HAY-FORKS.

*The Schedule referred to in these Letters Patent and making part of the same.*

TO ALL WHOM IT MAY CONCERN:

Be it known that I, PETER VANDERBELT, of Hughesville, in the county of Lycoming, and State of Pennsylvania, have invented a certain new and useful "Improvement in Horse Hay-Forks;" and I do hereby declare that the following is a clear, exact, and full description thereof, reference being had to the accompanying drawing, and to the letters of reference marked thereon.

The nature of my invention consists in so constructing a horse hay-fork, to be hereafter described, that it can be readily operated by the person using it; at the same time be economical.

To enable those skilled in the art to make and use my invention, I will proceed to describe its construction and operation, which is as follows:

The drawings represent an elevation of my machine. A is central stem, to which are pivoted, at $a$, two curved and barbed arms B, one on each side of A. To the upper end of each arm is pivoted an elbow piece, C, and these again are pivoted at $b$, this pivot or rivet passing through a slot, $c$, in the main stem A. One of these elbows has an eye, $d$, made on it, in which a lever can be placed, if desired. At the upper end of A, where it folds over, are two pulleys, D and $e$, the former, upper and larger one, being used to raise the machine and its load, (or lower it, if desired,) in the usual way, by horse-power, ropes, tackle, etc. A second rope, $f$, is passed over small pulley $e$, and is attached to one of the elbows, C, say the one having the eye and handle. In black outlines the machine is shown in its normal position, ready to be thrown or pushed into the hay like a harpoon; this being done by bearing on the lever or eye $d$, the arms B are spread open, as seen in red outline, both at top and at the bottom, spreading out the barbs, and thus holding a charge of hay, which can be raised, etc. The rope $f$ is generally retained by the person on the wagon who is unloading it. When the machine, with its load or charge, say, is carried into the "hay-mow," the person in charge pulls the rope $f$; this draws in the arms and their barbs together, and the machine, as it were, drops its load, and can be easily removed and carried back to repeat the operation. The centre stem A may also have its spear and barbed point, if desired. The upper pulley being in the fork, prevents the usual twisting and turning, which it is desirable to avoid.

Having thus described my invention, what I claim as new, and desire to secure by Letters Patent of the United States, is—.

The combination of slotted stem A, arms B, and elbow pieces C, when constructed, arranged, and operating in the manner as shown and described and for the purpose set forth.

PETER VANDERBELT, JR.

Witnesses:
S. S. FAHNESTOCK,
J. W. MISTER.